US012707224B2

(12) United States Patent
Leppanen et al.

(10) Patent No.: US 12,707,224 B2
(45) Date of Patent: Aug. 11, 2026

(54) METHOD AND APPARATUS FOR SCENE DEPENDENT LISTENER SPACE ADAPTATION

(71) Applicant: Nokia Technologies Oy, Espoo (FI)

(72) Inventors: Jussi Artturi Leppanen, Tampere (FI); Sujeet Shyamsundar Mate, Tampere (FI); Lasse Juhani Laaksonen, Tampere (FI); Arto Juhani Lehtiniemi, Lempaala (FI)

(73) Assignee: Nokia Technologies Oy, Espoo (FI)

( * ) Notice: Subject to any disclaimer, the term of this patent is extended or adjusted under 35 U.S.C. 154(b) by 256 days.

(21) Appl. No.: 18/269,871

(22) PCT Filed: Nov. 30, 2021

(86) PCT No.: PCT/FI2021/050830
§ 371 (c)(1),
(2) Date: Jun. 27, 2023

(87) PCT Pub. No.: WO2022/144494
PCT Pub. Date: Jul. 7, 2022

(65) Prior Publication Data

US 2024/0048936 A1 Feb. 8, 2024

(30) Foreign Application Priority Data

Dec. 29, 2020 (GB) ...................................... 2020672

(51) Int. Cl.
*H04S 7/00* (2006.01)

(52) U.S. Cl.
CPC ........... *H04S 7/304* (2013.01); *H04S 2400/11* (2013.01); *H04S 2400/15* (2013.01); *H04S 2420/03* (2013.01)

(58) Field of Classification Search
CPC .. H04S 7/304; H04S 2400/11; H04S 2400/15; H04S 2420/03
(Continued)

(56) References Cited

U.S. PATENT DOCUMENTS

2019/0116448 A1* 4/2019 Schmidt .................... G06F 3/01
2021/0195360 A1* 6/2021 Leider .................. A63F 13/285

FOREIGN PATENT DOCUMENTS

CN 110164464 A 8/2019
WO 2018224847 A2 12/2018
(Continued)

OTHER PUBLICATIONS

MPEG-I Audio Sub Group N19409, "Draft MPEG-I 6DoF Audio Encoder Input Format," Coding of moving pictures and audio Convenorship: Japan (JISC), ISO/IEC JTC 1/SC 29/WG11, Jul. 3, 2020.
(Continued)

*Primary Examiner* — Vivian C Chin
*Assistant Examiner* — Douglas J Suthers
(74) *Attorney, Agent, or Firm* — McCarter & English, LLP

(57) ABSTRACT

An apparatus for rendering a combined audio scene including circuitry configured to: obtain information configured to define, for a first audio scene, a first audio scene parameter; obtain further information configured to define, for a further audio scene, a further audio scene parameter; identify a location for a modification of at least in part the first audio scene, the location being configurable at least partially based on the further audio scene parameter; and prepare the combined audio scene for rendering, by modifying at least in part the first audio scene based on the further audio scene parameter such that the rendering of the combined audio scene incorporates the modified at least in part first audio
(Continued)

scene based on the identified location using the further scene parameter.

20 Claims, 12 Drawing Sheets

(58) Field of Classification Search
USPC .......................................................... 381/303
See application file for complete search history.

(56) References Cited

FOREIGN PATENT DOCUMENTS

| | | | |
|---|---|---|---|
| WO | WO-2020/051509 | A2 | 3/2020 |
| WO | 2020096406 | A1 | 5/2020 |

OTHER PUBLICATIONS

Leppanen, J. et al., "Listening Space Geometry Information in AR Testing for MPEG-I 6DoF Audio CfP," International Organisation for Standardisation, Coding of Moving Pictures and Audio, ISO/IEC JTC1/SC29/WG11 MPEG2020/M53586, Apr. 2020, Alpbach, Austria.

Kallman, M. et al., "Fully Dynamic Constrained Delaunay Triangulations," Geometric Modeling for Scientific Visualization, Jan. 22, 2004.

* cited by examiner

METHOD AND APPARATUS FOR SCENE DEPENDENT LISTENER SPACE ADAPTATION

CROSS REFERENCE TO RELATED APPLICATIONS

This patent application is a U.S. National Stage application of International Patent Application Number PCT/FI2021/050830 filed Nov. 30, 2021, which is hereby incorporated by reference in its entirety, and claims priority to GB 2020672.8 filed Dec. 29, 2020.

FIELD

The present application relates to method and apparatus for scene dependent listener space adaptation, but not exclusively for method and apparatus for scene dependent listener space adaptation for 6 degrees-of-freedom rendering.

BACKGROUND

Augmented Reality (AR) applications (and other similar virtual scene creation applications such as Mixed Reality (MR) and Virtual Reality (VR)) where a virtual scene is represented to a user wearing a head mounted device (HMD) have become more complex and sophisticated over time. The application may comprise data which comprises a visual component (or overlay) and an audio component (or overlay) which is presented to the user. These components may be provided to the user dependent on the position and orientation of the user (for a 6 degree-of-freedom application) within an Augmented Reality (AR) scene.

Scene information for rendering an AR scene typically comprises two parts. One part is the virtual scene information which may be described during content creation (or by a suitable capture apparatus or device) and represents the scene as captured (or initially generated). The virtual scene may be provided in an encoder input format (EIF) data format. The EIF and (captured or generated) audio data is used by an encoder to generate the scene description and spatial audio metadata (and audio signals), which can be delivered via the bitstream to the rendering (playback) device or apparatus. The EIF is a scene description format being developed in MPEG Audio coding (ISO/IEC JTC1 SC29 WG6) and is described in MPEG-I 6 DoF audio encoder input format developed for the call for proposals (CfP) on MPEG-I 6 DoF Audio. The implementation is described in accordance with this specification but can also use other scene description formats that may be provided or used by the content creator.

As per the EIF specification the encoder input data contains information describing an MPEG-I 6 DoF Audio scene. This covers all contents of the virtual auditory scene, i.e. all of its sound sources, and resource data, such as audio waveforms, source radiation patterns, information on the acoustic environment, etc. The input data also allows to describe changes in the scene. These changes, referred to as updates, can either happen at distinct times, allowing scenes to be animated (e.g. moving objects). Alternatively, they can be triggered manually or by a condition (e.g. listener enters proximity) or be dynamically updated from an external entity".

The second part of the AR audio scene rendering is related to the physical listening space (or physical space) of the listener (or end user). The scene or listener space information may be obtained during the AR rendering (when the listener is consuming the content).

Thus in implementing AR applications (compared to for example a Virtual Reality application which only features the captured virtual scene), the renderer has to consider the virtual scene acoustical properties as well as the ones arising from the physical space in which the content is being consumed.

The physical listening space information may be provided as an XML file, for example provided in a Listening Space Description File (LSDF) format within MPEG-I. The LSDF information may be obtained by the rendering device during rendering. For example the LSDF information may be obtained using sensing or measurement around the rendering device, or some other means such as a file or data entry describing the listening space acoustics. LSDF is just one example of a file format facilitating describing listening space geometry and acoustic properties. In different implementation embodiments, any suitable physical listening space description can be provided in any suitable format such as glTF (GL transmission format, https://www.khronos.org/gltf/), JSON, etc.

FIG. 1 shows an example scene where a virtual scene is located within a physical listening space. In this example there is a user 107 who is located within a physical listening space 101. Furthermore in this example the user 109 is experiencing a six-degree-of-freedom (6 DOF) virtual scene 113 with virtual scene elements. In this example the virtual scene 113 elements are represented by two audio objects, a first object 103 (guitar player) and second object 105 (drummer), a virtual occlusion element (e.g., represented as a virtual partition 117) and a virtual room 115 (e.g., with walls which have a size, a position, acoustic materials which are defined within the virtual scene description). The acoustic properties of the listener's physical space 101 are required for the renderer (which in this example is a hand held electronic device or apparatus 111) to perform the rendering so that the auralization is plausible for the user's physical listening space (e.g., position of the walls and the acoustic material properties of the wall). The rendering is presented to the user 107 in this example by a suitable headphone or headset 109.

SUMMARY

There is provided according to a first aspect an apparatus for rendering a combined audio scene comprising means configured to: obtain information configured to define, for a first audio scene, a first audio scene parameter; obtain further information configured to define, for a further audio scene, a further audio scene parameter; identify a location for a modification of at least in part the first audio scene, the location being configurable at least partially based on the further audio scene parameter; and prepare the combined audio scene for rendering, by modifying at least in part the first audio scene based on the further audio scene parameter such that the rendering of the combined audio scene incorporates the modified at least in part first audio scene based on the identified location using the further scene parameter.

The means configured to obtain information configured to define, for the first audio scene, the first audio scene parameter may be for defining a first audio scene geometry.

The means configured to identify a location for a modification of at least in part of the first audio scene may be configured to identify the location for the modification of at least in part of the first audio scene geometry further based on the information configured to define the first audio scene geometry.

The means configured to obtain the further information configured to define, for the further audio scene, the further audio scene parameter may be configured to obtain information configured to define a further audio scene geometry and further audio scene acoustic characteristics within a received bitstream comprising: the at least one further audio scene parameter configured to define the further audio scene geometry; the further audio scene acoustic characteristics; and at least one audio source parameter.

The further information configured to define the further audio scene parameter may comprise further audio scene information configured to control the modification of at least in part the first audio scene.

The further audio scene information configured to control the modification of at least in part the first audio scene may comprise at least one of: a panel size parameter configured to define a size of a panel for modifying at least in part the first audio scene; a panel material parameter configured to define a material to be used in the panel for modifying at least in part the first audio scene; a panel offset parameter configured to define an offset for a panel position with respect to the location for the modification of at least in part the first audio scene; a panel orientation parameter configured to define an orientation for a panel position with respect to location for the modification of at least in part the first audio scene; an acoustic environment parameter configured to define at least in part the first audio scene; and a mode parameter configured to define whether the further audio scene information is applicable based on a user interaction input.

The further audio scene information configured to control the modification of at least in part the first audio scene may further comprise at least one of: geometry information associated with the further audio scene; a position of at least one audio element within the further audio scene; a shape of at least one audio element within the further audio scene; an acoustic material property of at least one audio element within the further audio scene; a scattering property of at least one audio element within the further audio scene; a transmission property of at least one audio element within the further audio scene; a reverberation time property of at least one audio element within the further audio scene; and a diffuse-to-direct sound ratio property of at least one audio element within the further audio scene.

The means configured to obtain further information configured to define, for the further audio scene, the further audio scene parameter, may be configured to obtain at least one of: a further audio scene geometry; and further audio scene acoustic characteristics.

The further audio scene may be a virtual scene.

The further information configured to define, for the further audio scene, the further audio scene parameter may be within an encoder information format.

The first audio scene may be a physical space, and the first audio scene parameter may define a physical space geometry.

The means configured to obtain information configured to define, for the first audio scene, the first audio scene parameter may be configured to: obtain sensor information from at least one sensor positioned within the physical space; and determine at least one physical space parameter based on the sensor information.

The information configured to define, for the first audio scene, the first audio scene parameter may comprise at least one mesh element defining the first audio scene geometry.

Each of the mesh elements may comprise at least one vertex parameter and at least one face parameter, wherein the each vertex parameter may define a position relative to a mesh origin position and each face parameter may comprise a vertex identifier configured to identify vertices defining a geometry of the face and a material parameter identifying an acoustic parameter defining an acoustic property associated with the face.

The material parameter identifying the acoustic parameter defining the acoustic property associated with the face may comprise at least one of: a scattering property of the face; a transmission property of the face; a reverberation time property of the face; and a diffuse-to-direct sound ratio property of the face.

The first audio scene parameter may be within a listening space description file format.

The means configured to prepare the combined audio scene for rendering, by modifying at least in part the first audio scene based on the further audio scene parameter may be configured to: identify at least one surface of the first audio scene based on the identified location for the modification of at least in part the first audio scene based on the further audio scene parameter; identify a normal associated with the surface of the first audio scene; orient the panel relative to the surface of the first audio scene, the panel being associated with the further audio scene parameter; project edges and vertices associated with the panel to the surface of the first audio scene; split the surface of the first audio scene into non-overlapping polygons based on the projected edges and vertices; set material properties for the non-overlapping polygons based on the further audio scene parameter.

The non-overlapping polygons may be non-overlapping triangular faces.

According to a second aspect there is provided a method for an apparatus rendering a combined audio scene, the method comprising: obtaining information configured to define, for a first audio scene, a first audio scene parameter; obtaining further information configured to define, for a further audio scene, a further audio scene parameter; identifying a location for a modification of at least in part the first audio scene, the location being configurable at least partially based on the further audio scene parameter; and preparing the combined audio scene for rendering, by modifying at least in part the first audio scene based on the further audio scene parameter such that the rendering of the combined audio scene incorporates the modified at least in part first audio scene based on the identified location using the further scene parameter.

Obtaining information configured to define, for the first audio scene, the first audio scene parameter may be for defining a first audio scene geometry.

Identifying a location for a modification of at least in part of the first audio scene comprises identifying the location for the modification of at least in part of the first audio scene geometry further based on the information configured to define the first audio scene geometry.

Obtaining the further information configured to define, for the further audio scene, the further audio scene parameter may comprise obtaining information configured to define a further audio scene geometry and further audio scene acoustic characteristics within a received bitstream comprising: the at least one further audio scene parameter configured to define the further audio scene geometry; the further audio scene acoustic characteristics; and at least one audio source parameter.

The further information configured to define the further audio scene parameter may comprise further audio scene information configured to control the modification of at least in part the first audio scene.

The further audio scene information configured to control the modification of at least in part the first audio scene may comprise at least one of: a panel size parameter configured to define a size of a panel for modifying at least in part the first audio scene; a panel material parameter configured to define a material to be used in the panel for modifying at least in part the first audio scene; a panel offset parameter configured to define an offset for a panel position with respect to the location for the modification of at least in part the first audio scene; a panel orientation parameter configured to define an orientation for a panel position with respect to location for the modification of at least in part the first audio scene; an acoustic environment parameter configured to define at least in part the first audio scene; and a mode parameter configured to define whether the further audio scene information is applicable based on a user interaction input.

The further audio scene information configured to control the modification of at least in part the first audio scene may further comprise at least one of: geometry information associated with the further audio scene; a position of at least one audio element within the further audio scene; a shape of at least one audio element within the further audio scene; an acoustic material property of at least one audio element within the further audio scene; a scattering property of at least one audio element within the further audio scene; a transmission property of at least one audio element within the further audio scene; a reverberation time property of at least one audio element within the further audio scene; and a diffuse-to-direct sound ratio property of at least one audio element within the further audio scene.

Obtaining further information configured to define, for the further audio scene, the further audio scene parameter, may comprise obtaining at least one of: a further audio scene geometry; and further audio scene acoustic characteristics.

The further audio scene may be a virtual scene.

The further information configured to define, for the further audio scene, the further audio scene parameter may be within an encoder information format.

The first audio scene may be a physical space, and the first audio scene parameter may define a physical space geometry.

Obtaining information configured to define, for the first audio scene, the first audio scene parameter may comprise: obtaining sensor information from at least one sensor positioned within the physical space; and determining at least one physical space parameter based on the sensor information.

The information configured to define, for the first audio scene, the first audio scene parameter may comprise at least one mesh element defining the first audio scene geometry.

Each of the mesh elements comprises at least one vertex parameter and at least one face parameter, wherein the each vertex parameter may define a position relative to a mesh origin position and each face parameter may comprise a vertex identifier configured to identify vertices defining a geometry of the face and a material parameter identifying an acoustic parameter defining an acoustic property associated with the face.

The material parameter identifying the acoustic parameter defining the acoustic property associated with the face may comprise at least one of: a scattering property of the face; a transmission property of the face; a reverberation time property of the face; and a diffuse-to-direct sound ratio property of the face.

The first audio scene parameter may be within a listening space description file format.

Preparing the combined audio scene for rendering, by modifying at least in part the first audio scene based on the further audio scene parameter may comprise: identifying at least one surface of the first audio scene based on the identified location for the modification of at least in part the first audio scene based on the further audio scene parameter; identifying a normal associated with the surface of the first audio scene; orienting the panel relative to the surface of the first audio scene, the panel being associated with the further audio scene parameter; projecting edges and vertices associated with the panel to the surface of the first audio scene; splitting the surface of the first audio scene into non-overlapping polygons based on the projected edges and vertices; setting material properties for the non-overlapping polygons based on the further audio scene parameter.

The non-overlapping polygons may be non-overlapping triangular faces.

According to a third aspect there is provided an apparatus for rendering a combined audio scene, the apparatus comprising at least one processor and at least one memory including a computer program code, the at least one memory and the computer program code configured to, with the at least one processor, cause the apparatus at least to: obtain information configured to define, for a first audio scene, a first audio scene parameter; obtain further information configured to define, for a further audio scene, a further audio scene parameter; identify a location for a modification of at least in part the first audio scene, the location being configurable at least partially based on the further audio scene parameter; and prepare the combined audio scene for rendering, by modifying at least in part the first audio scene based on the further audio scene parameter such that the rendering of the combined audio scene incorporates the modified at least in part first audio scene based on the identified location using the further scene parameter.

The apparatus caused to obtain information configured to define, for the first audio scene, the first audio scene parameter may be for defining a first audio scene geometry.

The apparatus caused to identify a location for a modification of at least in part of the first audio scene may be caused to identify the location for the modification of at least in part of the first audio scene geometry further based on the information configured to define the first audio scene geometry.

The apparatus caused to obtain the further information configured to define, for the further audio scene, the further audio scene parameter may be caused to obtain information configured to define a further audio scene geometry and further audio scene acoustic characteristics within a received bitstream comprising: the at least one further audio scene parameter configured to define the further audio scene geometry; the further audio scene acoustic characteristics; and at least one audio source parameter.

The further information configured to define the further audio scene parameter may comprise further audio scene information configured to control the modification of at least in part the first audio scene.

The further audio scene information configured to control the modification of at least in part the first audio scene may comprise at least one of: a panel size parameter configured to define a size of a panel for modifying at least in part the first audio scene; a panel material parameter configured to define a material to be used in the panel for modifying at least in part the first audio scene; a panel offset parameter configured to define an offset for a panel position with respect to the location for the modification of at least in part the first audio scene; a panel orientation parameter configured to define an orientation for a panel position with respect to location for the modification of at least in part the first audio scene; an acoustic environment parameter configured to define at least in part the first audio scene; and a mode parameter configured to define whether the further audio scene information is applicable based on a user interaction input.

The further audio scene information configured to control the modification of at least in part the first audio scene may further comprise at least one of: geometry information associated with the further audio scene; a position of at least one audio element within the further audio scene; a shape of at least one audio element within the further audio scene; an acoustic material property of at least one audio element within the further audio scene; a scattering property of at least one audio element within the further audio scene; a transmission property of at least one audio element within the further audio scene; a reverberation time property of at least one audio element within the further audio scene; and a diffuse-to-direct sound ratio property of at least one audio element within the further audio scene.

The apparatus caused to obtain further information configured to define, for the further audio scene, the further audio scene parameter, may be caused to obtain at least one of: a further audio scene geometry; and further audio scene acoustic characteristics.

The further audio scene may be a virtual scene.

The further information configured to define, for the further audio scene, the further audio scene parameter may be within an encoder information format.

The first audio scene may be a physical space, and the first audio scene parameter may define a physical space geometry.

The apparatus caused to obtain information configured to define, for the first audio scene, the first audio scene parameter may be caused to: obtain sensor information from at least one sensor positioned within the physical space; and determine at least one physical space parameter based on the sensor information.

The information configured to define, for the first audio scene, the first audio scene parameter may comprise at least one mesh element defining the first audio scene geometry.

Each of the mesh elements may comprise at least one vertex parameter and at least one face parameter, wherein the each vertex parameter may define a position relative to a mesh origin position and each face parameter may comprise a vertex identifier configured to identify vertices defining a geometry of the face and a material parameter identifying an acoustic parameter defining an acoustic property associated with the face.

The material parameter identifying the acoustic parameter defining the acoustic property associated with the face may comprise at least one of: a scattering property of the face; a transmission property of the face; a reverberation time property of the face; and a diffuse-to-direct sound ratio property of the face.

The first audio scene parameter may be within a listening space description file format.

The apparatus caused to prepare the combined audio scene for rendering, by modifying at least in part the first audio scene based on the further audio scene parameter may be caused to: identify at least one surface of the first audio scene based on the identified location for the modification of at least in part the first audio scene based on the further audio scene parameter; identify a normal associated with the surface of the first audio scene; orient the panel relative to the surface of the first audio scene, the panel being associated with the further audio scene parameter; project edges and vertices associated with the panel to the surface of the first audio scene; split the surface of the first audio scene into non-overlapping polygons based on the projected edges and vertices; set material properties for the non-overlapping polygons based on the further audio scene parameter.

The non-overlapping polygons may be non-overlapping triangular faces.

According to a fourth aspect there is provided an apparatus comprising: means for obtaining information configured to define, for a first audio scene, a first audio scene parameter; means for obtaining further information configured to define, for a further audio scene, a further audio scene parameter; identifying a location for a modification of at least in part the first audio scene, the location being configurable at least partially based on the further audio scene parameter; and means for preparing the combined audio scene for rendering, by modifying at least in part the first audio scene based on the further audio scene parameter such that the rendering of the combined audio scene incorporates the modified at least in part first audio scene based on the identified location using the further scene parameter.

According to a fifth aspect there is provided a computer program comprising instructions [or a computer readable medium comprising program instructions] for causing an apparatus to perform at least the following: obtaining information configured to define, for a first audio scene, a first audio scene parameter; obtaining further information configured to define, for a further audio scene, a further audio scene parameter; identifying a location for a modification of at least in part the first audio scene, the location being configurable at least partially based on the further audio scene parameter; and preparing the combined audio scene for rendering, by modifying at least in part the first audio scene based on the further audio scene parameter such that the rendering of the combined audio scene incorporates the modified at least in part first audio scene based on the identified location using the further scene parameter.

According to an sixth aspect there is provided a non-transitory computer readable medium comprising program instructions for causing an apparatus to perform at least the following: obtaining information configured to define, for a first audio scene, a first audio scene parameter; obtaining further information configured to define, for a further audio scene, a further audio scene parameter; identifying a location for a modification of at least in part the first audio scene, the location being configurable at least partially based on the further audio scene parameter; and preparing the combined audio scene for rendering, by modifying at least in part the first audio scene based on the further audio scene parameter such that the rendering of the combined audio scene incorporates the modified at least in part first audio scene based on the identified location using the further scene parameter.

According to a seventh aspect there is provided an apparatus comprising: obtaining circuitry configured to obtain information configured to define, for a first audio scene, a first audio scene parameter; obtaining circuitry configured to obtain further information configured to define, for a further audio scene, a further audio scene parameter; identifying circuitry configured to identify a location for a modification of at least in part the first audio scene, the location being configurable at least partially based on the further audio scene parameter; and preparing circuitry configured to prepare the combined audio scene for rendering, by modifying at least in part the first audio scene based on the further audio scene parameter such that the rendering of the combined audio scene incorporates the modified at least in part first audio scene based on the identified location using the further scene parameter.

According to an eighth aspect there is provided a computer readable medium comprising program instructions for causing an apparatus to perform at least the following: obtaining information configured to define, for a first audio scene, a first audio scene parameter; obtaining further information configured to define, for a further audio scene, a further audio scene parameter; identifying a location for a modification of at least in part the first audio scene, the location being configurable at least partially based on the further audio scene parameter; and preparing the combined audio scene for rendering, by modifying at least in part the first audio scene based on the further audio scene parameter such that the rendering of the combined audio scene incorporates the modified at least in part first audio scene based on the identified location using the further scene parameter.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

The following describes in further detail suitable apparatus and possible mechanisms for modifying physical listening space parameters with content creator specified virtual space, when the virtual space is outside of the physical listening space to create a combined scene for rendering in Augmented Reality (and associated) applications.

As described in further detail hereafter the physical listening space parameters which are used to render the audio signals to the user. The physical listening space parameters (which may be in a Listening Space Description File (LSDF) format) may contain information on where in the listening space geometry certain elements that are defined in the geometry are placed. In some implementations the physical listening space may furthermore comprise an 'anchor' located within the listening space which may be used to define an origin from which a location of one or more (virtual or augmented) audio sources can be defined. For example the anchor may be located on a wall within the listening space, or the anchor may be located in the middle of a room or, for example, located at a statue's mouth which is augmented with a virtual hat and audio object associated with the position of the statue's mouth). The one or more (virtual or augmented) audio sources and their properties (e.g., relative position with respect to the anchor) can be defined in the EIF/bitstream.

Figure 3:
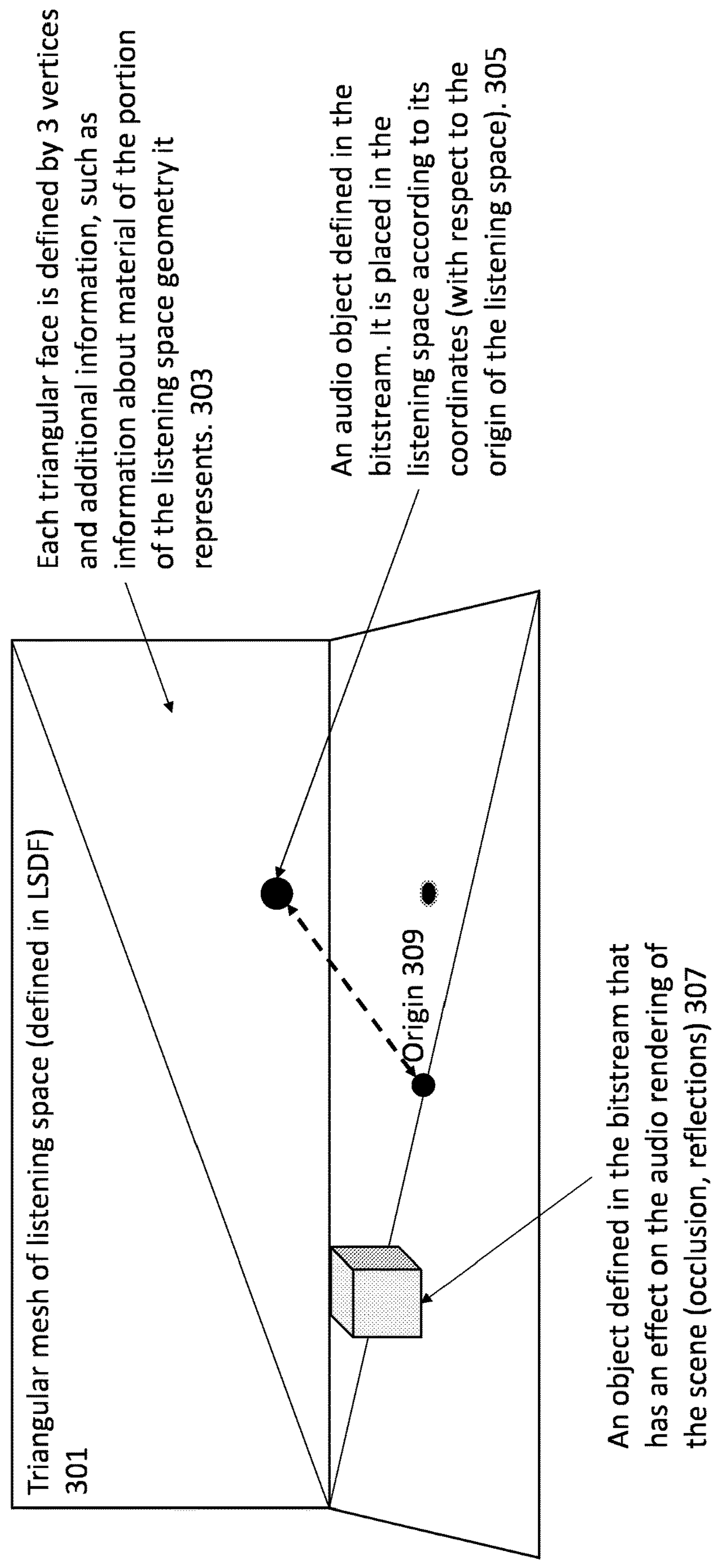
FIGS. 3 to 5 show schematically an example combined environment comprising virtual scene elements combined with a mesh describing the physical listening space, an anchor element, and how virtual scene elements may be defined with respect to the anchor element.

Thus for example with respect to FIG. 3 is shown a physical listening space 301 which is defined as a triangular mesh and which is defined within the LSDF. Each triangular face 303 is defined by 3 vertices and additional information, such as information about material of the portion of the listening space geometry it represents. The listening space mesh may comprise an origin 309 or locus from which locations (for example a vertex of the triangle mesh) within the listening space may be defined.

Thus for example a mesh 301 can in some embodiments be defined in the following format and is further explained within the international organisation for standardization specification iso/iec jtc1/sc29/wg6, mpeg audio coding iso/iec jtc1/sc29/wg6 n0012 October 2020, "draft listening space description file for MPEG-I 6 DoF AR audio evaluation".

| <Mesh> | | | | |
|---|---|---|---|---|
| Declares a triangle mesh. A mesh consists of a list of vertices (3D coordinates) and a number of triangular faces (i.e. the indices of three vertices). Meshes can be used to describe arbitrary geometry. Any <Mesh> node has to have one or more <Vertex>, <Face> child nodes, defining points and triangles. | | | | |
| Child node | Count | Description | | |
| <Vertex> | >=1 | Vertex (see below) | | |
| <Face> | >=1 | Face (see below) | | |
| Attribute | Type | Flags | Default | Description |
| id | ID | R | | Identifier |
| position | Position | O, M | (0, 0, 0) | Position (origin of the mesh) |
| orientation | Rotation | O, M | (0° 0° 0°) | Orientation |
| cspace | Coordinate space | O, M | relative | Spatial frame of reference (of the entire mesh, but not its vertices) |

The vertices and faces may furthermore be defined in the following manner in some embodiments.

| <Vertex> | | | | |
|---|---|---|---|---|
| Inside of a <Mesh> node, it declares a vertex (point) for spanning a triangle. Vertices have an index making them referenceable (e.g. in a Face). Vertices are always expressed in the mesh's local coordinate system, i.e. relative to the mesh's position. | | | | |
| Attribute | Type | Flags | Default | Description |
| index | Integer number | R | | Index of the vertex (unique integer) |
| position | Position | R | | Position (relative to the mesh's origin) |

| <Face> | | | | |
|---|---|---|---|---|
| Inside of a <Mesh> node, it declares a triangle spanning three vertices. Vertices are selected by their indices. The order of vertices matters, as it affects the faces normal, i.e. determining which side is front/back. Faces themselves have an index in order to make them referenceable. | | | | |
| Attribute | Type | Flags | Default | Description |
| index | Integer number | R | | Index of the face (unique integer) |
| vertices | List of three indices | R | | Vertex indices |
| material | Material ID | O | none | Associated acoustic material |

In some embodiments the faces of a mesh are (acoustically) one-sided only. The defined order of the vertices in a triangle determine the normal direction (front). Given a triangle $(\vec{v}_1, \vec{v}_2, \vec{v}_3)$ its front is considered the side, where its normal vector points to. Matching OpenGL conventions, the normal $\vec{n}$ of a triangle $(\vec{v}_1, \vec{v}_2, \vec{v}_3)$ is calculated by the cross product of two edge vectors $\vec{n}=(\vec{v}_2-\vec{v}_1)\times(\vec{v}_3-\vec{v}_1)$.

The material properties of the mesh may furthermore be provided by the bitstream (for example, derived or obtained from within the encoder input format (EIF) or other method specified scene description file or datastream). Thus for example the acoustic material properties of the mesh may be characterized by four parameters (r, s, t, c):

- Specular reflected energy r is reflected back in a distinct outgoing direction
- Diffuse reflected energy s is diffusely scattered back from the material
- Transmitted energy t passes through the material without changing the sound's direction
- Coupled energy c excites vibrations in the structure and is reemitted by the entire structure Thus for example the acoustic material properties may be described for each face of the mesh.

| <AcousticMaterial> | | | | |
|---|---|---|---|---|
| Declares an acoustic material. A material characterizes the acoustic behavior of surfaces in a 3D model. A material's properties are expressed frequency-dependent by absorption and optionally scattering coefficients. Any <AcousticMaterial> node has to have one or more <Frequency> child nodes. | | | | |
| Child node | Count | Description | | |
| <Frequency> | >=1 | Data specification (see below) | | |
| Attribute | Type | lags | Default | Description |
| Id | ID | | | Identifier |

| <Frequency> | | | | |
|---|---|---|---|---|
| Inside of an <AcousticMaterial> node, it declares the material's acoustic behavior at a specific frequency. A requirement for the coefficients is that r + s + t + c ≤ 1. | | | | |
| Attribute | Type | Flags | Default | Description |
| f | Float | R | | Frequency in Hertz |
| r | Float | O | 0 | Specular reflection coefficient (range 0 . . . 1) |
| s | Float | O | 0 | Diffuse scattering coefficient (range 0 . . . 1) |
| t | Float | O | 0 | Transmission coefficient (range 0 . . . 1) |
| c | Float | O | 0 | Coupling coefficient (range 0 . . . 1) |

The above information may thus be used by the renderer and is combined with the LSDF (which inherits the EIF parameters described above) to generate early reflections property for the audio scene.

Furthermore in FIG. 3 are shown elements which are defined within the virtual/augmented scene and which are passed to the renderer/player to be combined with the physical listening space. Thus is shown an example audio object 305 which is defined in the bitstream. The audio object 305 is configured to be placed in the listening space according to its coordinates (with respect to the origin 309 of the listening space). Furthermore is shown a virtual object 307. The virtual object 307 is defined in the bitstream and has an effect on the audio rendering of the scene, such as producing occlusions, reflections etc. The virtual objects may be furthermore be defined not only with respect to shape and dimensions but also with respect to the acoustic material properties above.

Figure 4:
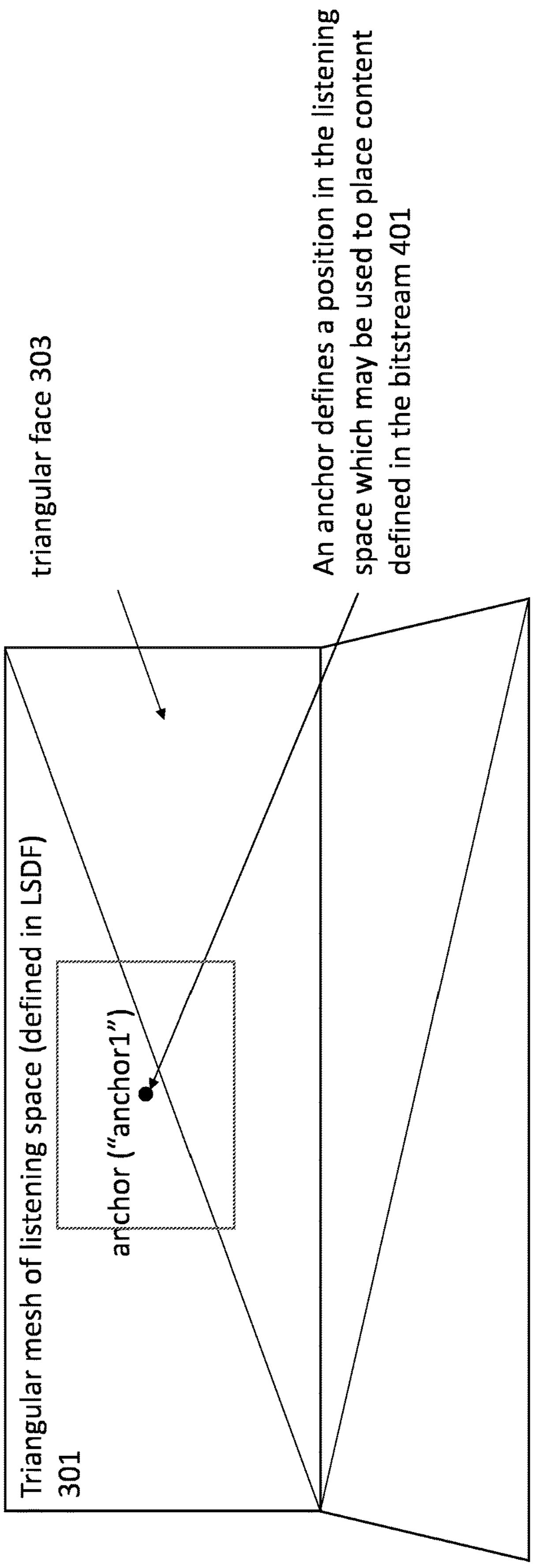

In some circumstances the LSDF may comprise information on where in the listening space geometry certain elements that are defined in the geometry can be placed. For example with respect to FIG. 4 there is shown an anchor 401 labelled as anchor1 which defines a position in the listening space which may be used to place content defined in the bitstream. In this example the anchor 401 is located (defined) on the wall of the listening space.

Figure 5:
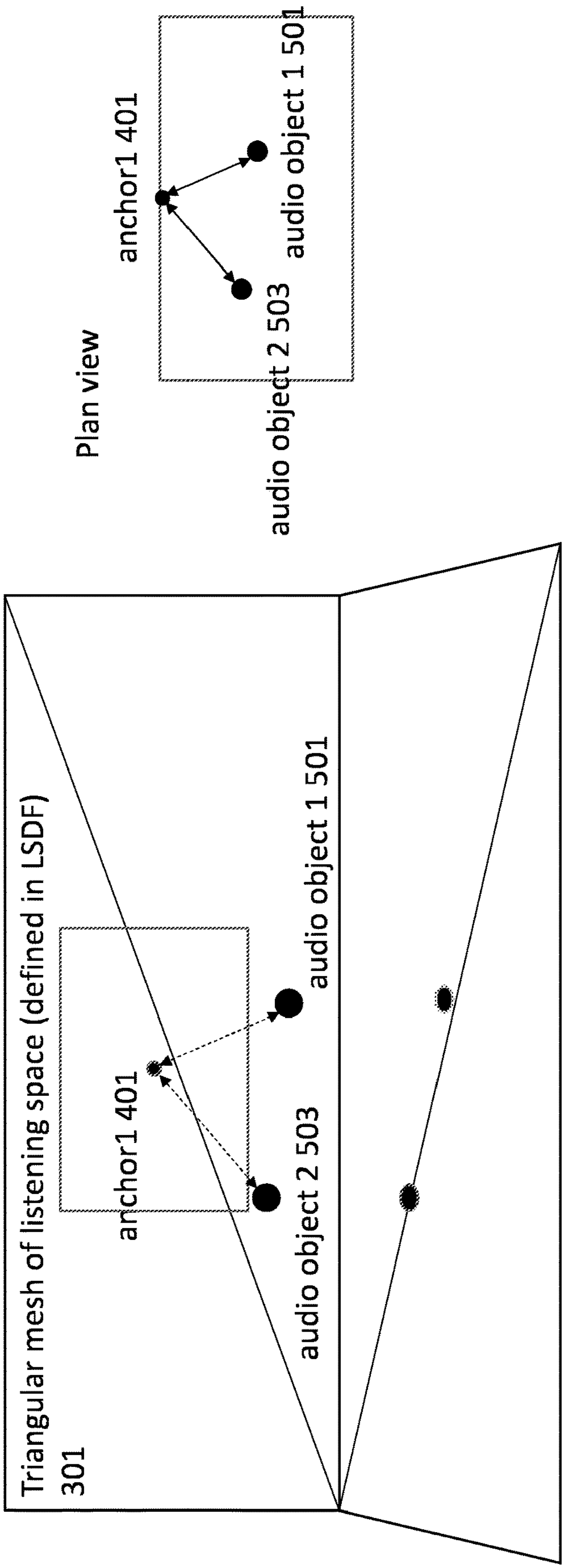

With respect to FIG. 5 is shown an example where two audio objects, audio object 1 501 and audio object 2 503 which are defined in the EIF/bitstream whose position is defined with respect to an anchor reference, anchor1 401. In such a manner when the bitstream and LSDF are combined, the audio objects can be placed with respect to the anchor defined in the LSDF. The anchors in the LSDF may, for example, be automatically derived by the user device as positions suitable for content to be placed in or they may be manually defined by the user.

The renderer then performs rendering such that the scene is plausible and aligned with the information obtained from the LSDF and the EIF.

In some circumstances an AR experience could be generated where a part of the scene content is intended to be placed outside of the region described by the listening space geometry description. In other words the virtual scene comprises at least one item which is located outside of the boundaries defining the physical listening space.

In the embodiments the apparatus and methods as discussed herein enable sound (direct sound and reflections) from within the listening space to reach the part of the scene that is outside of the listening space geometry description. Additionally the embodiments as discussed herein furthermore are configured such that sound from the part of the scene that is outside of the listening space is able to reach the listening space geometry.

Thus in some embodiments the apparatus and methods as described herein can be configured to create a AR rendering experience based on render-time listening space information. The listening space information representation is agnostic to the content being consumed. In other words, the derivation of the listening space is configured to be independent of the intended scene to be consumed. Thus in some embodiments there is a clear delineation of the listening space representation for AR consumption. Consequently, the audio renderer can in some embodiments be configured to perform acoustic modelling according to the acoustic properties described in the listener space representation.

However, for certain types of scenes, the listening representation produced by the AR consumption device is modified in accordance with the needs of the scene. For example, if there is an acoustic "hole" in the consumed scene but not in the listening space, this is addressed by the embodiments as discussed herein. Furthermore as the scene agnostic nature of the listening space representation is retained, the content creation is configured to be enhanced.

Thus in some embodiments the content creator is configured to define "mesh injection" to the listening space description such that the resultant mesh is compatible with the desired scene in order that the content is experienced properly (as intended by the content creator).

Figure 6:
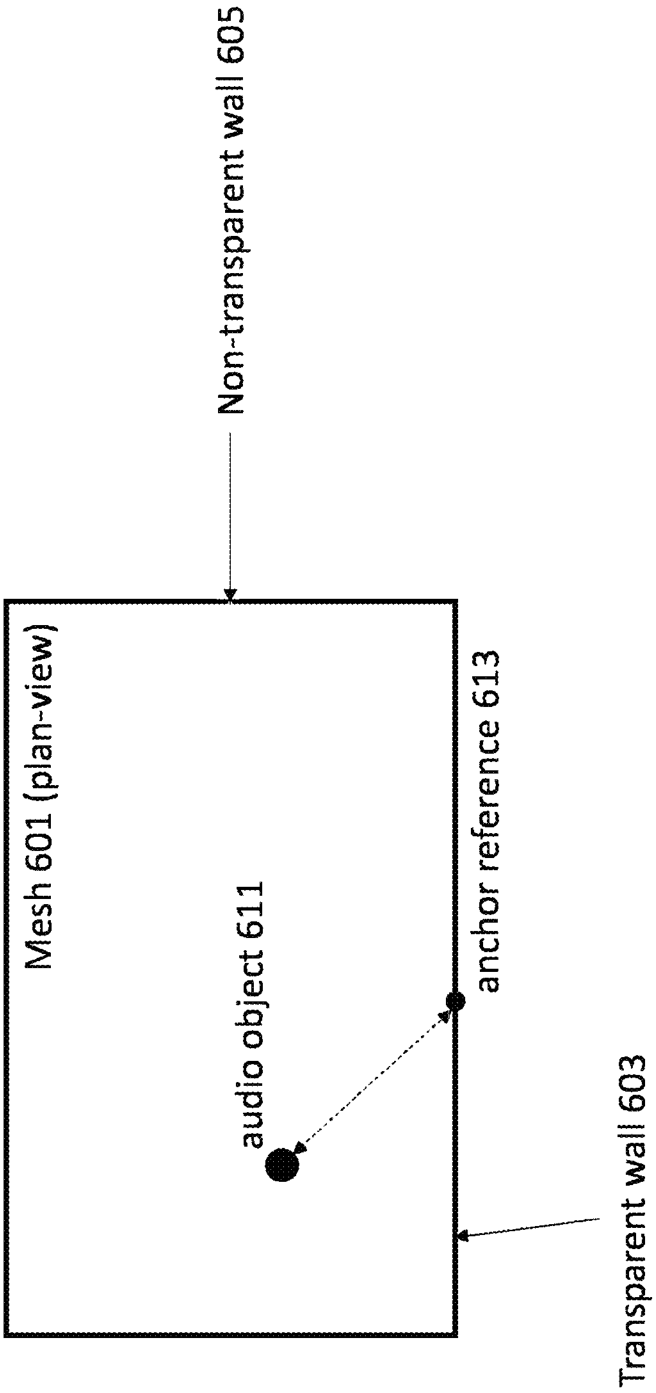
FIG. 6 shows schematically an augmented reality scene comprising elements defined with respect to an augmented reality scene anchor element.
Figure 7:
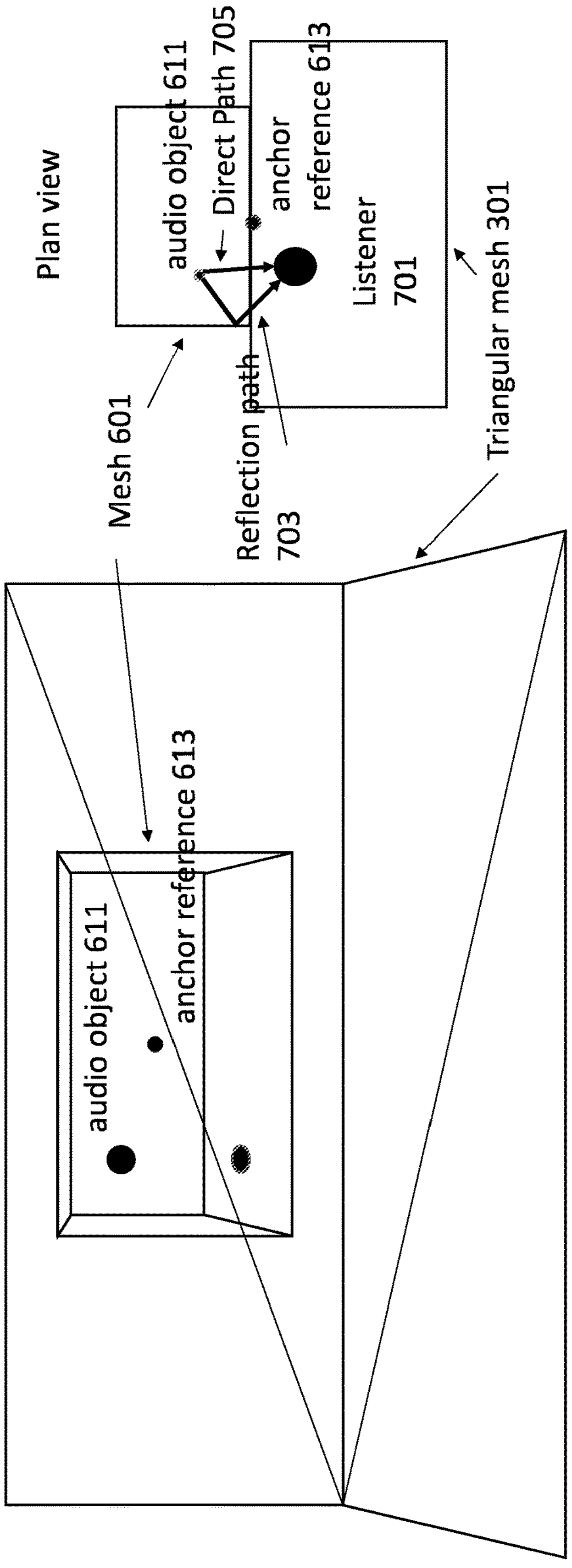
FIG. 7 shows a further example combined environment comprising the augmented reality scene elements shown in FIG. 6 combined with a mesh describing the physical listening space as shown in FIG. 4.

An example of this is shown with respect to FIGS. 6 and 7. Thus for example FIG. 6 shows a plan view of an example virtual scene comprising a mesh 601 which is defined by an acoustically transparent wall 603 (or window) on which is located an anchor 613. Furthermore the virtual scene comprises acoustically non-transparent walls 605. Within the virtual scene is an audio object 611 which is located relative to the anchor 613.

Thus as shown in FIG. 6, a content creator may have created content (the virtual scene) which contains the mesh 601 (virtual room) and audio object 611 with one (or more) of the walls of the virtual scene transparent (or not present/defined) thus giving a user a view into the room from outside. The anchor 613 may furthermore be defined in the virtual scene such that the virtual scene can be placed next to a user's listening space. Thus as shown in FIG. 7 the virtual scene mesh 601 and the triangular mesh (physical listening space) 301 are aligned by the anchor 613 and an associated anchor on the triangular mesh (physical listening space) 301.

The embodiments as discussed here are configured such that the listening space mesh 601 is modified as the mesh of the listening space is not acoustically transparent and thus otherwise the audio (701, 705) from the virtual room would not reach the user listener 701 who is always inside the listening space mesh 301.

The embodiments as described herein therefore are able to overcome an important implementation challenge while using scene agnostic AR sensing with scene specific requirements. Moreover, the embodiments are also applicable to generic AR sensing and AR rendering scenarios.

Furthermore as discussed herein there is apparatus and possible mechanisms providing a practical rendering for immersive audio within AR applications.

The embodiments as described herein are therefore configured to modify listening space properties based on an obtained virtual scene, when the virtual scene is outside the bounds of the physical listening space to obtain a fused rendering which provides appropriate audio performance irrespective of the scene properties. Additionally in some embodiments a change in the listening space geometry depending on the scene may be needed even if the virtual scene starts within the physical space but extends beyond the physical space boundaries. Similarly, in some embodiments the virtual scene may start outside the physical listening space boundary and end within the confines of the physical listening space. In other words there may be a change in the listening space geometry where at least part of the virtual scene is located outside of the physical space boundaries.

In some embodiments the apparatus and possible mechanisms as described herein may be implemented within a system with 6-degrees-of-freedom (i.e., the listener can move within the scene and the listener position is tracked) spatial audio signal rendering. For example the spatial audio signal rendering may be a binaural audio signal rendering for headphones or similar or a multichannel audio signal rendering for a multichannel loudspeaker system.

The modification may be implemented in some embodiments by embedding a mesh and subsequently subdividing the resultant mesh representation at the perimeter of the embedded mesh, where the acoustic properties for the embedded mesh are based on parameters described in the content creator bitstream whereas the parameters for the mesh at the perimeter of the embedded mesh are derived from the listening space geometry description. This ensures compliance with bitstream specified virtual content scene description (e.g., inserting an acoustically transparent hole in the virtual scene in the wall of an otherwise continuous wall in the real-world). This achieves consistent experience thresholds while responding to real-world listening spaces in AR/XR rendering scenarios.

In some embodiments, both, the embedded mesh and the resultant perimeter mesh are subdivided in order to achieve a manifold mesh representation.

In some embodiments the content creator is configured to add listening space definition modification information to the EIF which is then encoded and sent to the renderer. At the playback/user device then the following operations can be performed:

Obtain bitstream (comprising the defined virtual scene parameters)

Figure 1:
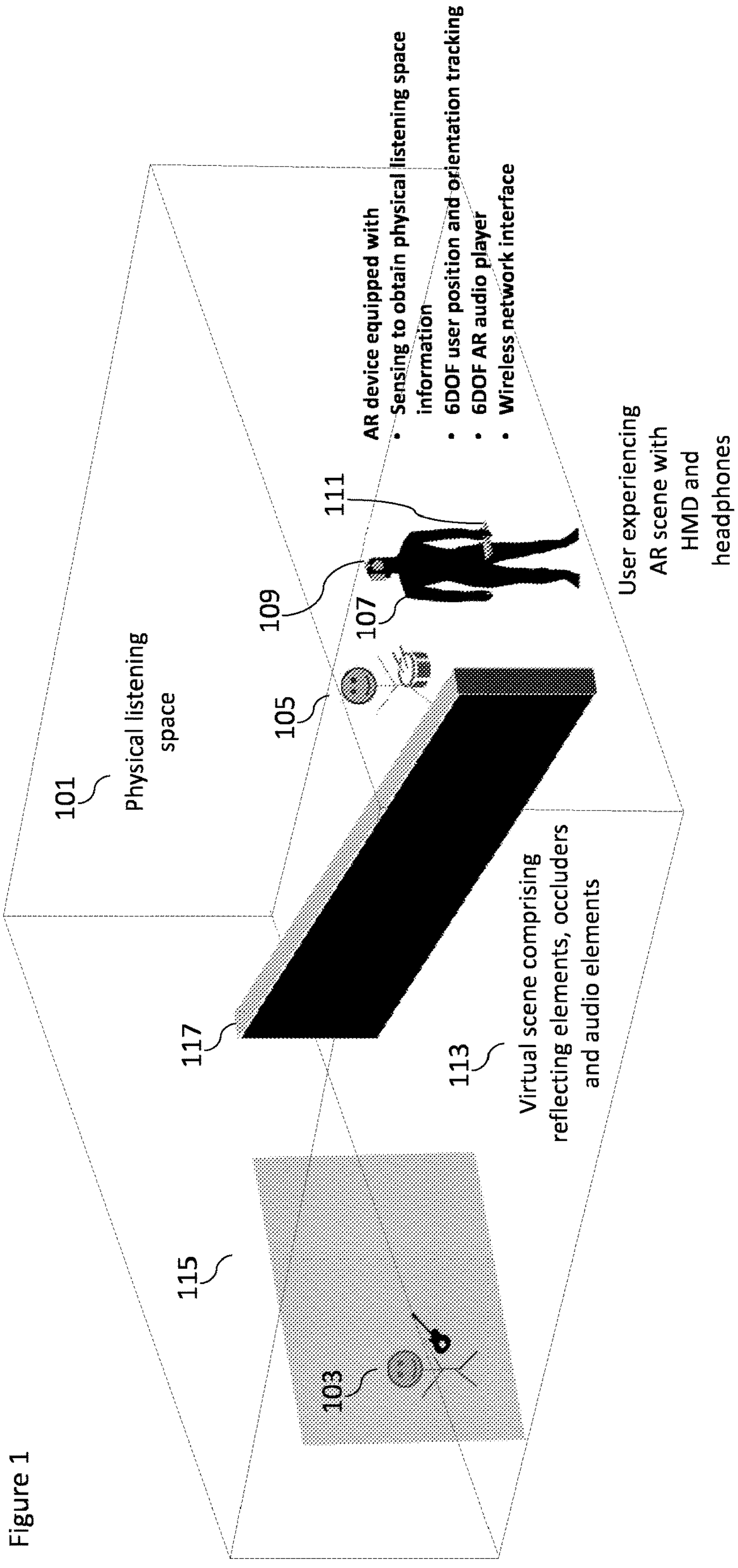
FIG. 1 shows schematically a suitable environment showing an example of a combination of virtual scene elements within a physical listening space.
Figure 2:
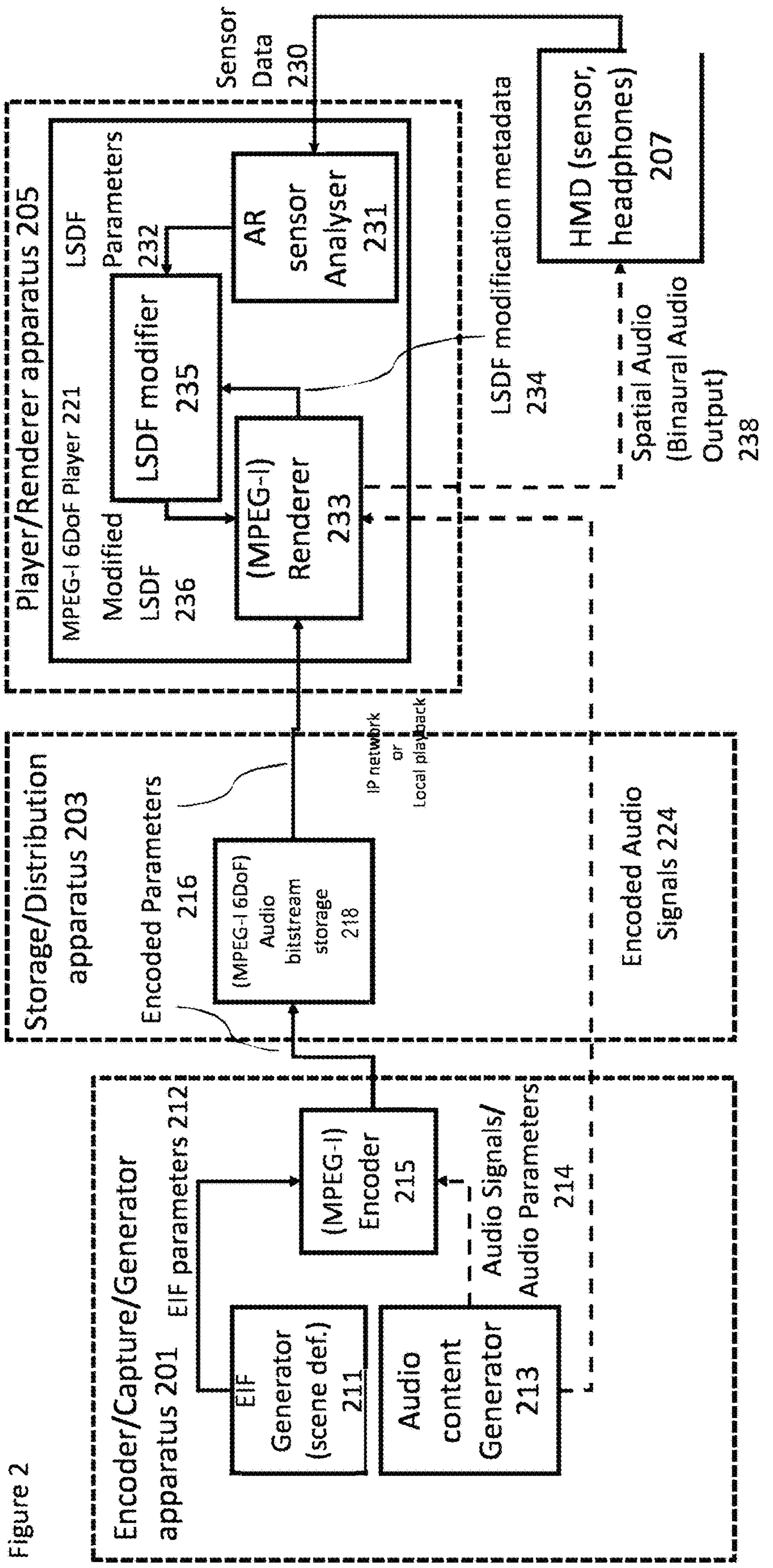
FIG. 2 shows schematically a system of apparatus suitable for implementing some embodiments.

Decode and pass listening space description modification information to a listening space modification block Modify listening space definition and pass it to renderer With respect to FIG. 2 there is shown a schematic view of a system suitable for providing the rendering modification implementation according to some embodiments (and which can be used for a scene such as shown in FIG. 7).

In the example shown in FIG. 2 there is shown an encoder/capture/generator apparatus 201 configured to obtain the content in the form of virtual scene definition parameters and audio signals and provide a suitable bitstream/data-file comprising the audio signals and virtual scene definition parameters.

In some embodiments as shown in FIG. 2 the encoder/capture/generator apparatus 201 comprises an encoder input format (EIF) data generator 211. The encoder input format (EIF) data generator 211 is configured to create EIF (Encoder Input Format) data, which is the content creator scene description. The scene description information contains virtual scene geometry information such as positions of audio elements. Furthermore the scene description information may comprise other associated metadata such as directivity and size and other acoustically relevant elements. For example the associated metadata could comprise positions of virtual walls and their acoustic properties and other acoustically relevant objects such as occluders. An example of acoustic property is acoustic material properties such as (frequency dependent) absorption or reflection coefficients, amount of scattered energy, or transmission properties. In some embodiments, the virtual acoustic environment can be described according to its (frequency dependent) reverberation time or diffuse-to-direct sound ratio. The EIF data generator 211 in some embodiments may be more generally known as a virtual scene information generator. The EIF parameters 212 can in some embodiments be provided to a suitable (MPEG-I) encoder 215.

Furthermore in some embodiments the encoder input format (EIF) data generator 211 is configured to generate anchor reference information. The anchor reference information may be defined in the EIF to indicate that the position of the specified audio elements are to be obtained from the listener space via the LSDF.

Furthermore as described above, new metadata is added to the EIF/bitstream to assist in the modification of the LSDF information within the renderer. The renderer may then be configured to obtain the LSDF prior to combining or fusing with the EIF defined virtual scene and then rendering the combination.

In some embodiments the generated EIF contains an <Anchor> element, which describes how content is to be situated with respect to an anchor in the LSDF. In the example below, an ObjectSource "object1" is placed in the audio scene according to the LSDF with a position of x=0.0 y=1.0 z=0.5 with respect to the anchor "wall_anchor" (found in the LSDF).

```
<Anchor id="room_anchor" lsdf_ref="wall_anchor">
  <ObjectSource id="object1" position="0.0 1.0 0.5"
  signal="object1_signal">
</Anchor>
```

Furthermore in some embodiments the encoder input format (EIF) data generator 211 is further configured to generate and insert physical listening space modification parameters (which may be also called LSDF modification information). These parameters or information instruct the renderer to make modifications to the LSDF. In some embodiments this may be implemented using EIF notation, by creating a new EIF element (<LSDFModification>) which describes the modification to be made. An example definition of such an element is shown below:

The EIF derived LSDF modification parameter can in some embodiments be signaled as a new MHAS packet or as part of another MHAS packet which provides the acoustic scene description. The data structures for signaling the LSDF Modifications may be, for example, implemented and described in the following way:

```
aligned(8) LSDFModificationListStruct( ){
  unsigned int(8) num_lsdf_modifications;
  for(i=0; i<num_ar_anchors; i++){
    LSDFModificationStruct( );
  }
}
aligned(8) LSDFModificationStruct( ){
  unsigned int(8) lsdf_modification_id;
  unsigned int(8) material_id;
  unsigned int(8) window_material_id;
  unsigned int(8) reference_anchor_id;
  unsigned int(8) acoustic_environment_id;
  PositionOrientationOffsetStruct( );
}
  aligned(8) PositionOrientationOffsetStruct( ){
    signed int(32) pos_x;
    signed int(32) pos_y;
    signed int(32) pos_z;
```

<LSDFModification>

Declares a modification to be made to the LSDF.

| Attribute | Type | Flags* | Default | Description |
|---|---|---|---|---|
| Id | ID | R | | Identifier |
| window_size | String | O | | If set, a window for LSDF modification is created with a size as indicated by the parameter value. |
| window_material_id | ID | O | | Available only if window_size is set. Material of window created in the LSDF. If no material is set, window material is not set (transparent). |
| window_offset | position | O | | Available only if window_size is set. Adds an offset to the position of the window w.r.t to the anchor that references this. |
| window_orientation | orientation | O | | Available only if window_size is set. Adds a rotation to the window. |
| acoustic_environment_id | ID | O | | Add/replace acoustic environment properties in the LSDF for the acoustic environment the <Anchor> node which references this element is in. |
| Mode | event | O | | Present if the modification is applicable as an interaction |

*R—required parameter, O—optional parameter

In such embodiments the LSDF modification is referred to by the <Anchor> object by the <LSDFModification> id attribute.

Thus for example the modification information may in some embodiments be provided in the EIF as follows (the bold sections indicating additions to current EIF specification):

-continued

```
    signed int(32) rot_yaw;
    signed int(32) rot_pitch;
    signed int(32) rot_roll;
```

1. <LSDFModification> element is created:
   <LSDFModification id="window_mod" window_size="0.5 0.5" window_offset="0.0 0.1 -0.3"/>
2. <Anchor> element references the <LSDFModification> element
   <Anchor id="room_anchor" lsdf_ref="wall_anchor" lsdf_modification=window_mod>
   <ObjectSource id="object1" position="0.0 1.0 0.5" signal="object1_signal">
   </Anchor>

Although the term window has been used above, in some embodiments, this term may be more generally defined as a panel or polygon. Thus generally other shapes in addition to a 'square' window may be used. For example a window or panel may be defined as a rectangle (H×W). However a mesh or some other shape may also be defined. In other words the 'window' example as presented above is an example of a mesh which is included conditionally in the EIF if the LSDF does not carry certain physical features (such as a window or even a wall depending on the scene).

Thus, for example, the 'window' may represent mesh elements which are included for creating a wall where none exists in an LSDF for a particular room. In such a scenario, the material is present and results in a wall which is not acoustically transparent.

In some embodiments the encoder/capture/generator apparatus 201 comprises an audio content generator 213. The audio content generator 213 is configured to generate the audio content corresponding to the audio scene. The audio content generator 213 in some embodiments is configured to generate or otherwise obtain audio signals associated with the virtual scene. For example in some embodiments these audio signals may be obtained or captured using suitable microphones or arrays of microphones, be based on processed captured audio signals or synthesised. In some embodiments the audio content generator 213 is furthermore configured in some embodiments to generate or obtain audio parameters associated with the audio signals such as position within the virtual scene, directivity of the signals. The audio signals and/or parameters 212 can in some embodiments be provided to a suitable (MPEG-I) encoder 215.

The encoder/capture/generator apparatus 201 may further comprise a suitable (MPEG-I) encoder 215. The MPEG-I encoder 215 in some embodiments is configured to use the received EIF parameters 212 and audio signals/parameters 214 and based on this information generate a suitable encoded bitstream. This can for example be a MPEG-I 6 DoF Audio bitstream. In some embodiments the encoder 214 can be a dedicated encoding device. The output of the encoder can be passed to a distribution or storage device.

In some embodiments the most relevant reflecting elements in case of the defining of the virtual scene can be derived by the encoder 215. In other words the encoder 215 can be configured to select or filter from the list of elements within the virtual scene relevant elements and only encode and/or pass parameters based on these to the player/renderer. This will avoid sending the redundant reflecting elements in the bitstream to the renderer. The material parameters may then be delivered for all the reflecting elements which are not acoustically transparent. The material parameters can contain parameters related to the reflection or absorption parameters, transmission, or other acoustic properties. For example, the parameters can comprise absorption coefficients at octave or third octave frequency bands.

In some embodiments the virtual scene description also consists of one or more acoustic environment descriptions which are applicable to the entire scene or a certain sub-space/sub-region/sub-volume of the entire scene. The virtual scene reverberation parameters can in some embodiments are derived based on the frequency dependent reverberation characterization information such as pre-delay, reverberation time 60 (RT60) which specifies the time required for an audio signal to decay to 60 dB below the initial level, or Diffuse-to-Direct-Ratio (DDR) which specifies the level of the diffuse reverberation relative to the level of the total emitted sound in each of the acoustic environment descriptions specified in the EIF.

In some embodiments the LSDF modification information can be delivered as part of the encoder input format (as described above) or any other suitable method of content creator scene description format. For example in some embodiments the modification information is not a separate data structure but is part of the scene description with a different syntax but carries the semantics of modifying the physical space description for the purpose of audio rendering. In some embodiments, the listening space modification may also be incorporated as part of any suitable format of scene description transmission format in JSON, XML, etc.

Furthermore the system of apparatus shown in FIG. 2 comprises (an optional) storage/distribution apparatus 203. The storage/distribution apparatus 203 is configured to obtain, from the encoder/capture/generator apparatus 201, the encoded parameters 216 and encoded audio signals 224 and store and/or distribute these to a suitable player/renderer apparatus 205. In some embodiments the functionality of the storage/distribution apparatus 203 is integrated within the encoder/capture/generator apparatus 201.

In some embodiments the bitstream is distributed over a network with any desired delivery format. Example delivery formats which may be employed in some embodiments can be DASH (Dynamic Adaptive Streaming over HTTP), CMAF (Common Media Application Format), HLS (HTP live streaming), etc.

In some embodiments such as shown in FIG. 2 the audio signals are transmitted in a separate data stream to the encoded parameters. Thus for example in some embodiments the storage/distribution apparatus 203 comprises a (MPEG-I 6 DoF) audio bitstream storage 218 configured to obtain, store/distribute the encoded parameters 216. In some embodiments the audio signals and parameters are stored/transmitted as a single data stream or format.

The system of apparatus as shown in FIG. 2 further comprises a player/renderer apparatus 205 configured to obtain, from the storage/distribution apparatus 203 the encoded parameters 216 and encoded audio signals 224. Additionally in some embodiments the player/renderer apparatus 205 is configured to obtain sensor data (associated with the physical listening space) 230 and configured to generate a suitable rendered audio signal or signals which are provided the user (for example as shown in FIG. 2 a head mounted device headphones).

The player/renderer apparatus 205 in some embodiments comprises a (MPEG-I 6 DoF) player 221 configured to receive the 6 DoF bitstream 216 and audio data 224. The player 221 in some embodiments may in case of AR rendering the device is also expected to be equipped with AR sensing module to obtain the listening space physical properties.

The 6 DoF bitstream (with the audio signals) alone is sufficient to perform rendering in VR scenarios. That is, in pure VR scenarios the necessary acoustic information is carried in the bitstream and is sufficient for rendering the audio scene at different virtual positions in the scene, according to the acoustic properties such as materials and reverberation parameters.

For AR scenarios, the renderer can obtain the listener space information using the AR sensing provided to the renderer for example in a LSDF format, during rendering. This provides information such as the listener physical space reflecting elements (such as walls, curtains, windows, opening between the rooms, etc.).

Thus for example in some embodiments the user or listener is operating (or wearing) a suitable head mounted device (HMD) 207. The HMD may be equipped with sensors configured to generate suitable sensor data 230 which can be passed to the player/renderer apparatus 205. Sensors on the AR device are used to obtain information about the listener space.

This data or information may comprise a triangular mesh describing the listener space geometry as well as material information for the faces of the mesh. For, example, a Microsoft HoloLens sensor is configured to create a triangular mesh of the listening space using cameras and a time-of-flight camera for depth mapping. Material information may be obtained from the camera images using image classification methods. Classification neural networks (CNNs), for example may be used to determine the material information or data. This for example may be implemented in the manner as described in the reference https://openaccess.thecvf.com/content_cvpr_2015/papers/Bell_Material_Recognition_in_2015_CVPR_paper.pdf.

The player/renderer apparatus 205 (and the MPEG-I 6 DoF player 221) furthermore in some embodiments comprises an AR sensor analyser 231. The AR sensor analyser 231 is configured to generate (from the HMD sensed data or otherwise) the physical space information. This can for example be in a LSDF parameter format and the relevant LSDF parameters 232 passed to a LSDF modifier 235. In some embodiments the listener space representation is created by assigning material information to the obtained mesh faces. The obtained mesh may be optionally run through a mesh simplification algorithm to create a simpler mesh with fewer faces (for lower computational complexity). The mesh simplification operation may be any suitable one such as https://cg.informatik.uni-freiburg.de/intern/seminar/meshSimplification_2004_Talton.pdf or http://graphics.stanford.edu/courses/cs468-10-fall/LectureSlides/08_Simplification.pdf.

Therefore the AR sensing interface (the AR sensor analyser 231) in some embodiments is configured to transform the sensed representation into a suitable format (for example LSDF) in order to provide the listening space information in an interoperable manner which can cater to different renderer implementations as long as they are format (LSDF) compliant. The listening space information for example may be provided as a single mesh in the LSDF.

In some embodiments the physical listening space material information is associated with the mesh faces. The mesh faces together with the material properties represent the reflecting elements which are used for early reflections modelling.

The listening space description mesh can, in some embodiments, be processed to obtain an implicit containment box for describing the acoustic environment volume for which the acoustic parameters such as RT60, DDR are applicable. In cases where the physical listening space comprises multiple acoustic environments, the LSDF can consist of a mesh corresponding to a non-overlapping contiguous set of mesh.

In some embodiments the player 221 further comprises a LSDF modifier 235. The LSDF modifier 235 is configured to receive any obtained LSDF parameters from the AR sensor analyser 231, in other words the parameters associated with the physical listening space. Furthermore in some embodiments the LSDF modifier 235 further is configured to receive LSDF modification metadata 234 from the renderer 233. The LSDF modifier 235 may then in some embodiments be configured to modify the obtained LSDF parameters based on the modification metadata 234. The modified LSDF or physical listening space parameters 236 can then be passed to the renderer 233.

Figure 8A:
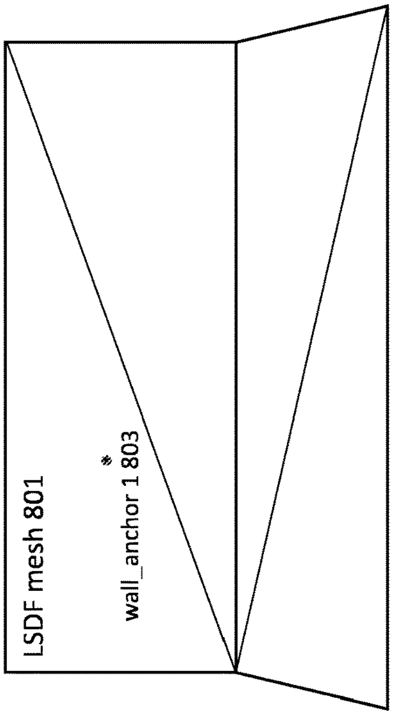
FIGS. 8*a* to 8*d* show an example of modifying the mesh describing the physical listening space as shown in FIG. 4 based on the augmented reality scene elements shown in FIG. 6 according to some embodiments.

With respect to FIGS. 8*a* to 8*d* an example of such a modification is shown. For example FIG. 8*a* shows a LSDF mesh 801 with a single anchor point, wall anchor 1 803 (the mesh in some embodiments may fully enclose the audio scene but is not shown in FIG. 8*a* to make the figures clearer).

Figure 8B:
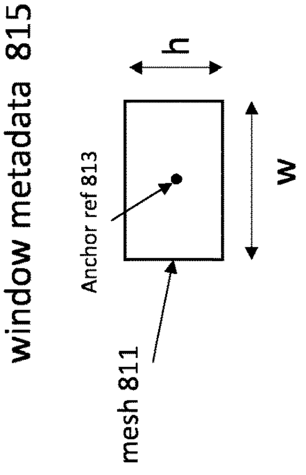

Furthermore is shown in FIG. 8*b* an example window metadata 815 which may have been added by the content creator to represent the addition of a window to the LSDF mesh geometry.

Figure 8C:
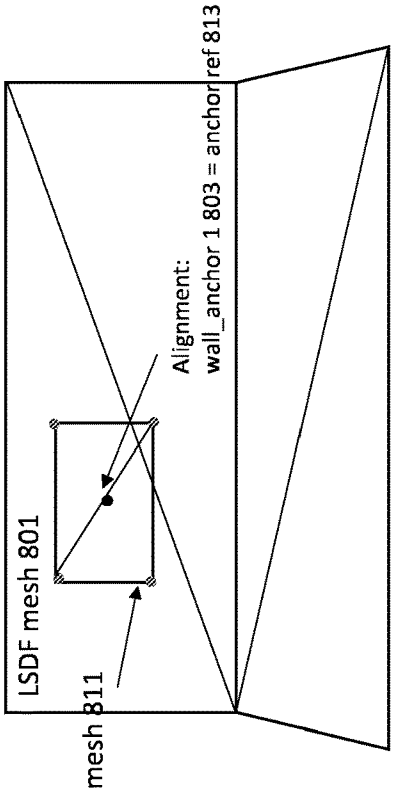
Figure 8D:
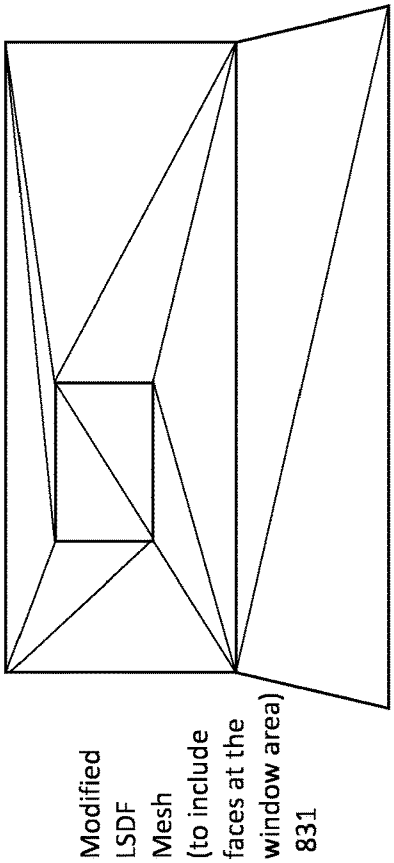

The LSDF modifier 235 may then in some embodiments be configured to modify the obtained LSDF parameters by initially aligning the window (such as shown in FIG. 8*b*) to the LSDF mesh (as shown in FIG. 8*a*). This alignment is shown in FIG. 8*c* where the window mesh 811 is located on the LSDF mesh 801 at a position such that the wall anchor 1 803 location is the same as the anchor ref 813 location.

Having aligned the window to the mesh the LSDF modifier 235 is configured to modify the LSDF mesh 801 to incorporate the window mesh 811. This is shown, for example in FIG. 8*d* where the modified LSDF mesh 831 includes faces at the window area.

Figure 10A:
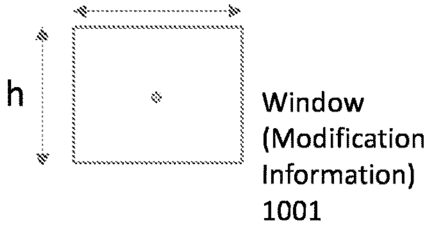
FIGS. 10*a* to 10*f* show stages of an example modification of the mesh describing the physical listening space based on the augmented reality scene elements according to some embodiments.
Figure 10B:
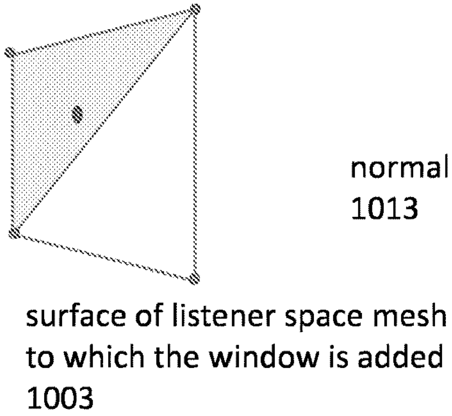
Figure 10C:
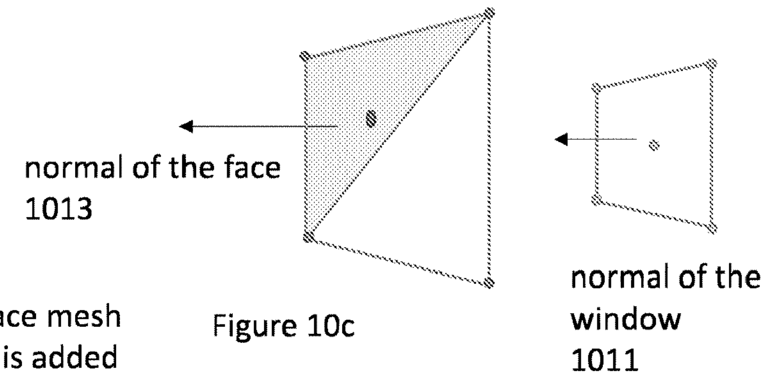
Figure 10D:
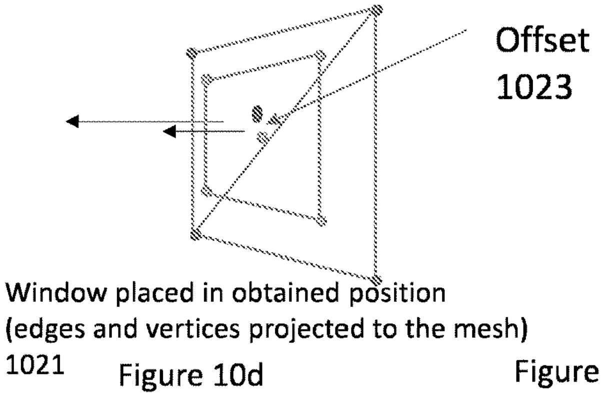
Figure 10E:
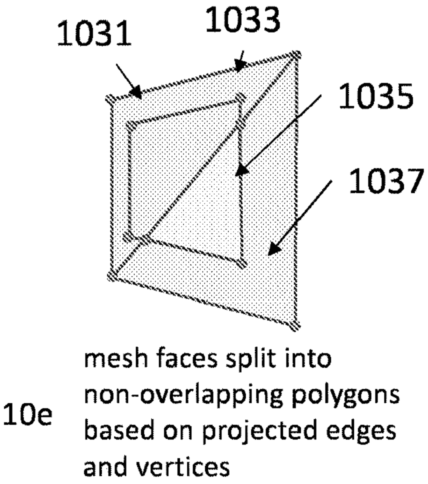
Figure 10F:
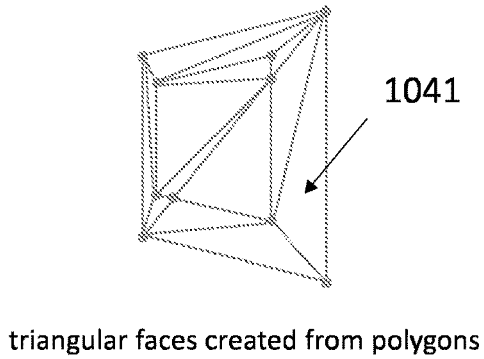
Figure 11:
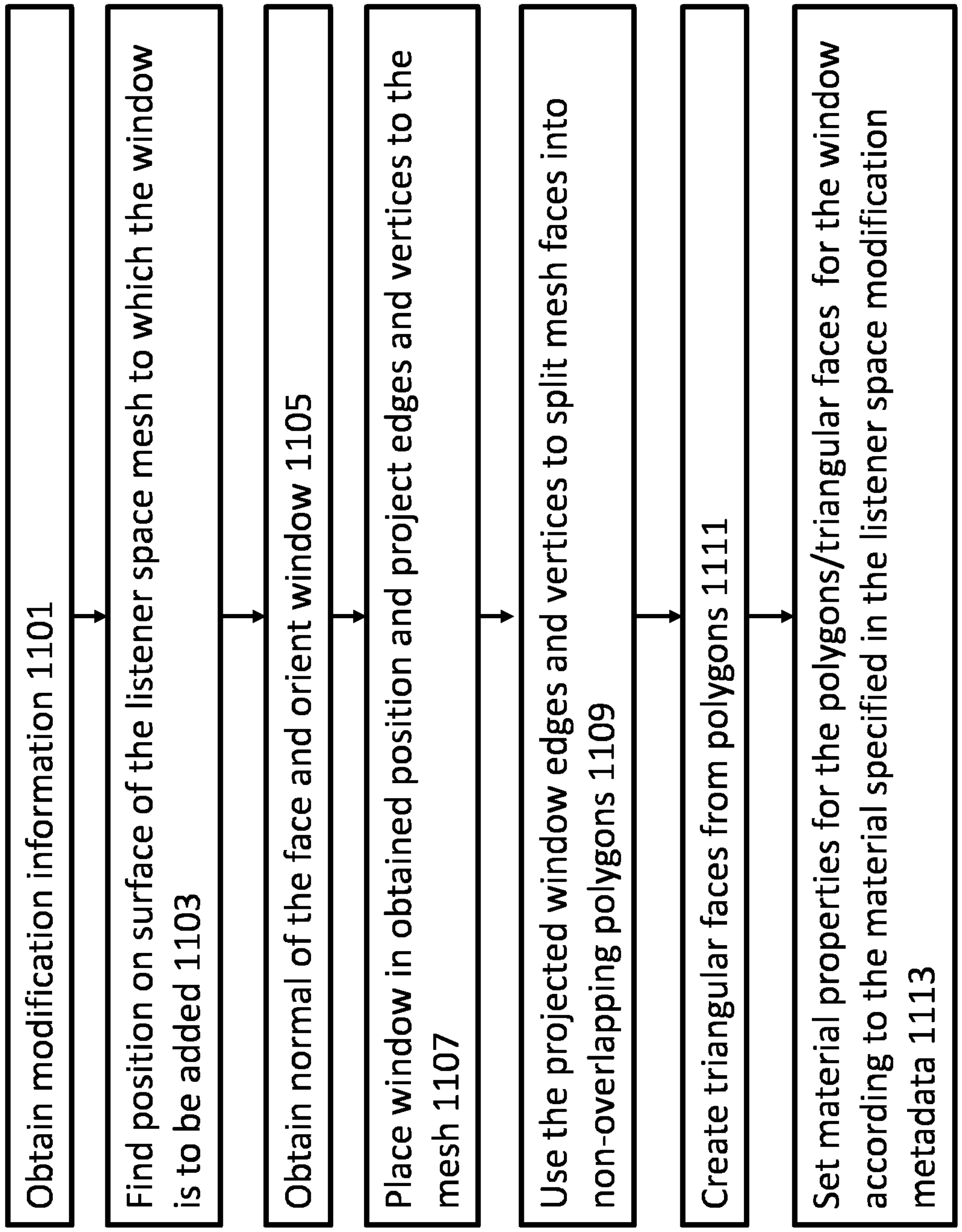
FIG. 11 shows a flow diagram of the modification of the mesh describing the physical listening space based on the augmented reality scene elements according to some embodiments.

With respect to FIG. 11 is shown a flow diagram of an example method for modifying the LSDF mesh. Furthermore the application of the methods to the example mesh as shown in FIGS. 8*a* to 8*d* are further shown in FIGS. 10*a* to 10*f*.

Thus in some embodiments the LSDF modifier 235 is configured to obtain the modification information from the bitstream. This information comprising information or data on what type of modification will be made and information on where in the listener space geometry the modification is to be made. The modification information may include the size of a region (window) to be added to the listener space mesh and any material information for the region. Positioning of the window may be done as in the MPEG-I case, using the anchors as explained above. The positions of the anchors in the listener space may be obtained automatically or set by the user. In some embodiments instead of anchors, the position may be provided relative to the origin of the listener space. Furthermore alternatively in some embodiments as the position could be specified using descriptive information such as “center point of ceiling” or on “a wall”. Thus for example FIG. 10*a* shows an example modification information window 1001 which defines the geometry of the shape and an anchor position within the window. The operation of obtaining the modification information is shown in FIG. 11 by step 1101.

Having obtained the modification information then a position on the face of the listener space mesh where the window is to be placed is found. In the example where there is a defined anchor location, the face which is closest to the anchor is found and the closest point on the face to the anchor is found. This may then be defined as the reference point for positioning the window. In some embodiments the modification may further include position offset information as well. With respect to FIG. 10*b* is shown the surface of listener space mesh 1003 to which the window is to be added. The operation of finding the position on the face of the listener space mesh where the window is to be placed is shown in FIG. 11 by step 1103.

Having identified the position on the mesh face then the window is then oriented to match the orientation of the mesh face. In some embodiments any orientation information provided with the window is also applied. This is shown in FIG. 10*c* where the normal of the window 1011 and the normal of the face 1013 are identified and aligned by orienting the normal of the window 1011 to match the normal of the face 1013. The operation of orienting the window to match the orientation of the mesh face is shown in FIG. 11 by step 1105.

After orienting and positioning the window accordingly, the window edges are then projected on to the listener space mesh. This is shown in FIG. 10*d* where the window is shown place in the obtained position with edges and vertices projected 1021 to the mesh. As shown in FIG. 10*d* there may be an offset 1023 (as defined above) between the anchor points of the face and the window. The operation of projecting the window edges to the listener space mesh is shown in FIG. 11 by step 1107.

The modifier in some embodiments is then configured to split the (triangular) faces in the listener space mesh using the projected window edges and vertices into polygons. This splitting of the listener space mesh into polygons is shown in FIG. 10*e* where the original two triangles are split into four polygons 1031, 1033, 10335, 1037. The new polygons are defined using the projected vertices and edges and additional vertices placed at intersections of the projected edges and the existing face edges of the listener space geometry. The operation of splitting the faces into non-overlapping polygons is shown in FIG. 11 by step 1109.

Then the new polygons are further split into suitable triangles to generate new triangle faces. This is shown in FIG. 10*f* where the polygons are further split into new triangular faces, an example of which is shown by reference 1041. The operation of splitting the polygons into new triangle faces is shown in FIG. 11 by step 1111.

Then for the new polygons or triangular faces which are associated with the projected window then the material properties for the polygons/triangular faces relating to the added window are set according to the material specified in the listener space modification metadata. This is shown in FIG. 11 by step 1113.

The modified (LSDF) data or information is then passed to the renderer 233.

The player/renderer apparatus 205 (and the MPEG-I 6 DoF player 221) furthermore in some embodiments comprises a (MPEG-I) renderer 233 configured to receive the virtual space parameters 216, the audio signals 224 and the (modified) physical listening space parameters 236 and generate suitable spatial audio signals which as shown in FIG. 2 are output to the HMO 207, for example as binaural audio signals to be output by headphones. The renderer is configured to combine the modified LSDF information (the modified physical space information) and the EIF information (the virtual space information) and combine these in order to generate a fused or combined virtual scene-physical space scene which can furthermore then receive information concerning the listener or user's position and/or orientation and from this generate a suitable spatial audio signals 238 (for example a binaural audio signal output) which can be output to the user or listener to be output via a suitable apparatus, for example headphones.

Figure 9:
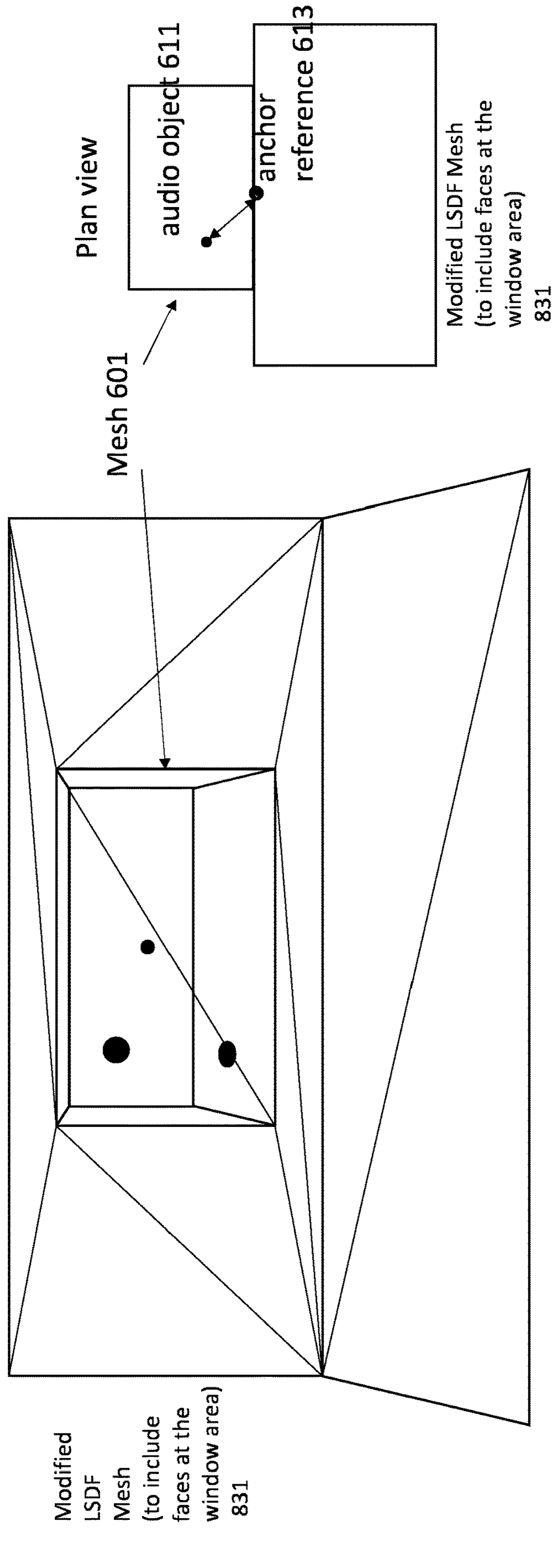
FIG. 9 shows an example combination of the modified mesh describing the physical listening space and the augmented reality scene elements.

The combination of the information can for example be shown with respect to the examples of FIGS. 6 and 7 where the modified LSDF mesh is combined with the virtual space mesh 601 where the interface is defined by a face at the window area. This is shown, for example, in FIG. 9 showing the modified LSDF mesh 831 and the virtual mesh 601 and where the audio object 611 located within the virtual mesh 601 is able to be heard by a listener or user within the physical listening space as defined by the modified LSDF mesh.

Having generated the combined mesh then a spatial signal processing operation may be implemented according to any suitable method.

In the above examples the combined audio scene is one generated from a virtual scene and a listening space (audio scene) however this concept can be generalised such that is covers apparatus for rendering a combined audio scene where there is a first audio scene and further audio scene which are 'concatenated'. Thus in some embodiments there may be apparatus comprising means (or a method) configured to obtain information configured to define a first audio scene geometry; obtain further information configured to define a further audio scene geometry and further audio scene acoustic characteristics. The means may further be configured to identify a location for a modification of the first audio scene geometry, the location being configurable at least partially based on the information configured to define the further audio scene geometry and then prepare the combined audio scene for rendering, by modifying the information configured to define the first audio scene geometry based on the further information configured to define the further audio scene geometry such that the rendering of the combined audio scene incorporates the further audio scene geometry and the further audio scene acoustic characteristics.

Figure 12:
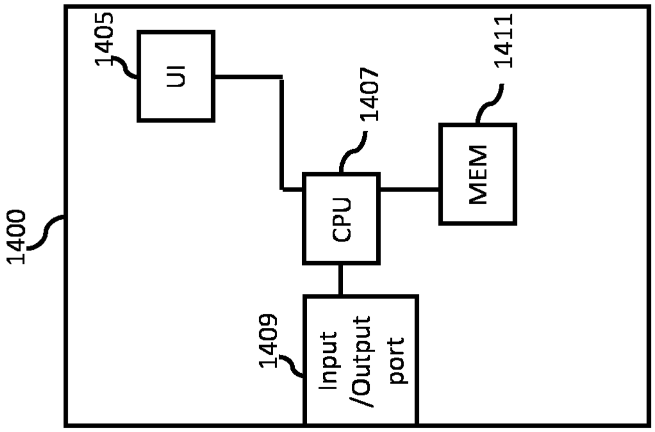
FIG. 12 shows schematically an example device suitable for implementing the apparatus shown.

With respect to FIG. 12 an example electronic device which may represent any of the apparatus shown above. The device may be any suitable electronics device or apparatus. For example in some embodiments the device 1400 is a mobile device, user equipment, tablet computer, computer, audio playback apparatus, etc.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1409 may be configured to receive the signals and in some embodiments determine the parameters as described herein by using the processor 1407 executing suitable code.

It is also noted herein that while the above describes example embodiments, there are several variations and modifications which may be made to the disclosed solution without departing from the scope of the present invention.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. An apparatus for rendering a combined audio scene, the apparatus comprising:

at least one processor; and at least one memory storing instructions that, when executed with the at least one processor, cause the apparatus at least to:

obtain information configured to define, for a first audio scene, a first audio scene parameter;

obtain further information configured to define, for a further audio scene, a further audio scene parameter, wherein the further audio scene parameter is configured to enable adding of a window to the first audio scene;

identify a location for a modification of at least in part the first audio scene, the location being configurable at least partially based on the further audio scene parameter, wherein the location comprises a location for adding of the window; and prepare the combined audio scene for rendering, with modifying at least in part the first audio scene based on the further audio scene parameter such that the rendering of the combined audio scene incorporates the modified at least in part first audio scene based on the identified location using the further audio scene parameter, wherein the window is configured to enable combination of the further audio scene to the first audio scene via the window.

2. The apparatus as claimed in claim 1, wherein the instructions, when executed with the at least one processor, cause the apparatus to:

obtain information configured to define, for the first audio scene, the first audio scene parameter defining a first audio scene geometry.

3. The apparatus as claimed in claim 2, wherein the instructions, when executed with the at least one processor, cause the apparatus to:

identify the location for the modification of at least in part of the first audio scene to identify the location for the modification of at least in part of the first audio scene geometry further based on the information configured to define the first audio scene geometry.

4. The apparatus as claimed in claim 1, wherein the instructions, when executed with the at least one processor, cause the apparatus to:

define a further audio scene geometry and further audio scene acoustic characteristics within a received bitstream comprising: at least one-further audio scene parameter configured to define the further audio scene geometry; the further audio scene acoustic characteristics; and at least one audio source parameter.

5. The apparatus as claimed in claim 1, wherein the instructions, when executed with the at least one processor, cause the apparatus to define the further audio scene parameter comprising further audio scene information configured to control the modification of at least in part the first audio scene.

6. The apparatus as claimed in claim 5, wherein the further audio scene information configured to control the modification of at least in part the first audio scene comprises at least one of:

a window size parameter configured to define a size of the window for modifying at least in part the first audio scene;

a window material parameter configured to define a material to be used in the window for modifying at least in part the first audio scene;

a window offset parameter configured to define an offset for a window position with respect to the location for the modification of at least in part the first audio scene;

a window orientation parameter configured to define an orientation for a panel position with respect to the location for the modification of at least in part the first audio scene;

an acoustic environment parameter configured to define at least in part the first audio scene; or a mode parameter configured to define whether the further audio scene information is applicable based on a user interaction input.

7. The apparatus as claimed in claim 5, wherein the further audio scene information configured to control the modification of at least in part the first audio scene further comprises at least one of:

geometry information associated with the further audio scene;

a position of at least one audio element within the further audio scene;

a shape of at least one audio element within the further audio scene;

an acoustic material property of at least one audio element within the further audio scene;

a scattering property of at least one audio element within the further audio scene;

a transmission property of at least one audio element within the further audio scene;

a reverberation time property of at least one audio element within the further audio scene; or a diffuse-to-direct sound ratio property of at least one audio element within the further audio scene.

8. The apparatus as claimed in claim 1, wherein the instructions, when executed with the at least one processor, cause the apparatus to obtain at least one of: a further audio scene geometry; or further audio scene acoustic characteristics.

9. The apparatus as claimed in claim 8, wherein the instructions, when executed with the at least one processor, cause the apparatus to define the further audio scene parameter within an encoder information format.

10. The apparatus as claimed in claim 1, wherein the further audio scene is a virtual scene.

11. The apparatus as claimed in claim 1, wherein the first audio scene is a physical space, and the first audio scene parameter defines a physical space geometry.

12. The apparatus as claimed in claim 11, wherein the instructions, when executed with the at least one processor, cause the apparatus to:

obtain sensor information from at least one sensor positioned within the physical space; and determine at least one physical space parameter based on the sensor information.

13. The apparatus as claimed in claim 11, wherein the first audio scene parameter is within a listening space description file format.

14. The apparatus as claimed in claim 1, wherein the defined first audio scene parameter comprises at least one mesh element defining a first audio scene geometry.

15. The apparatus as claimed in claim 14, wherein the at least one mesh element comprises at least one vertex parameter and at least one face parameter, wherein the at least one vertex parameter defines a position relative to a mesh origin position and the at least one face parameter comprises a vertex identifier configured to identify vertices defining a geometry of a face and a material parameter identifying an acoustic parameter defining an acoustic property associated with the face.

16. The apparatus as claimed in claim 15, wherein the material parameter identifying the acoustic parameter defining the acoustic property associated with the face comprises at least one of:

a scattering property of the face;

a transmission property of the face;

a reverberation time property of the face; or a diffuse-to-direct sound ratio property of the face.

17. The apparatus as claimed in claim 1, wherein the instructions, when executed with the at least one processor, cause the apparatus to:

identify at least one surface of the first audio scene based on the identified location for the modification of at least in part the first audio scene based on the further audio scene parameter;

identify a normal associated with the at least one surface of the first audio scene;

orient the window relative to the at least one surface of the first audio scene, the window being associated with the further audio scene parameter;

project edges and vertices associated with the window to the at least one surface of the first audio scene;

split the at least one surface of the first audio scene into non-overlapping polygons based on the projected edges and vertices; and set material properties for the non-overlapping polygons based on the further audio scene parameter.

18. The apparatus as claimed in claim 17, wherein the non-overlapping polygons are non-overlapping triangular faces.

19. A method for an apparatus rendering a combined audio scene, the method comprising:

obtaining information configured to define, for a first audio scene, a first audio scene parameter;

obtaining further information configured to define, for a further audio scene, a further audio scene parameter, wherein the further audio scene parameter is configured to enable adding of a window to the first audio scene;

identifying a location for a modification of at least in part the first audio scene, the location being configurable at least partially based on the further audio scene parameter, wherein the location comprises a location for adding of the window; and preparing the combined audio scene for rendering, with modifying at least in part the first audio scene based on the further audio scene parameter such that the rendering of the combined audio scene incorporates the modified at least in part first audio scene based on the identified location using the further audio scene parameter, wherein the window is configured to enable combination of the further audio scene to the first audio scene via the window.

20. A non-transitory computer-readable medium comprising instructions stored thereon for performing at least the following:

obtaining information configured to define, for a first audio scene, a first audio scene parameter;

obtaining further information configured to define, for a further audio scene, a further audio scene parameter, wherein the further audio scene parameter is configured to enable adding of a window to the first audio scene;

identifying a location for a modification of at least in part the first audio scene, the location being configurable at least partially based on the further audio scene parameter, wherein the location comprises a location for adding of the window; and preparing the combined audio scene for rendering, with modifying at least in part the first audio scene based on the further audio scene parameter such that the rendering of the combined audio scene incorporates the modified at least in part first audio scene based on the identified location using the further audio scene parameter, wherein the window is configured to enable combination of the further audio scene to the first audio scene via the window.

* * * * *